US012680921B2

(12) United States Patent (10) Patent No.: US 12,680,921 B2
Gueller (45) Date of Patent: Jul. 14, 2026

(54) METHOD AND DEVICE FOR PRODUCING A FILM-SHAPED TEST BODY

(71) Applicant: Chemspeed Technologies AG, Füllinsdorf (CH)

(72) Inventor: Rolf Gueller, Herznach (CH)

(73) Assignee: Chemspeed Technologies AG, Füllinsdorf (CH)

( * ) Notice: Subject to any disclaimer, the term of this patent is extended or adjusted under 35 U.S.C. 154(b) by 326 days.

(21) Appl. No.: 18/579,417

(22) PCT Filed: Jul. 12, 2022

(86) PCT No.: PCT/CH2022/050016
§ 371 (c)(1),
(2) Date: Jan. 15, 2024

(87) PCT Pub. No.: WO2023/283747
PCT Pub. Date: Jan. 19, 2023

(65) Prior Publication Data
US 2024/0337568 A1 Oct. 10, 2024

(30) Foreign Application Priority Data

Jul. 16, 2021 (CH) ................................. 70074/2021

(51) Int. Cl.
*G01N 1/28* (2006.01)
(52) U.S. Cl.
CPC ........... *G01N 1/2813* (2013.01); *G01N 1/286* (2013.01); *G01N 2001/2873* (2013.01)
(58) Field of Classification Search
CPC ................. G01N 1/2813; G01N 1/286; G01N 2001/2873
USPC ......................................................... 435/29
See application file for complete search history.

(56) References Cited

U.S. PATENT DOCUMENTS

| | | | | |
|---|---|---|---|---|
| 4,668,472 | A * | 5/1987 | Sakamoto ............ | G01N 33/525 |
| | | | | 206/455 |
| 10,571,800 | B2 * | 2/2020 | Brouns .................... | G03F 1/62 |
| 2002/0061597 | A1 * | 5/2002 | Herpst ................... | G01N 21/03 |
| | | | | 436/164 |
| 2012/0292507 | A1 * | 11/2012 | Morikawa ............ | G01N 1/2813 |
| | | | | 250/307 |

FOREIGN PATENT DOCUMENTS

| | | | |
|---|---|---|---|
| CN | 110057639 | A | 7/2019 |
| CN | 210037436 | U | 2/2020 |
| JP | 2002221473 | A | 8/2002 |
| JP | WO 2020/250633 | * | 12/2020 |
| WO | WO 2000/039566 | * | 7/2000 |
| WO | WO 2000/0068662 | * | 11/2000 |

OTHER PUBLICATIONS

Wu et al., Improving performances of microchannels in microfluidic chip using solidifiable adhesive film, Surface Engineering, vol. 31, Iss. 7, (2015), pp. 545-548.*

* cited by examiner

*Primary Examiner* — Jennifer M. H. Tichy
(74) *Attorney, Agent, or Firm* — The Webb Law Firm

(57) ABSTRACT

A device for producing a film-shaped test body from a solidifiable test substance includes a substrate on which a substance film is formed from test substance applied to the substrate. The device further includes a film-detachment tool having an adhesive surface with which the tool can be placed on the substance film formed on the substrate, the film-detachment tool being shaped so that it leaves a sub-region of the substance film uncovered. The adhesive surface of the film-detachment tool preferably exhibits greater adhesiveness towards a test film that can be created by solidification of the substance film than does the substrate.

9 Claims, 5 Drawing Sheets

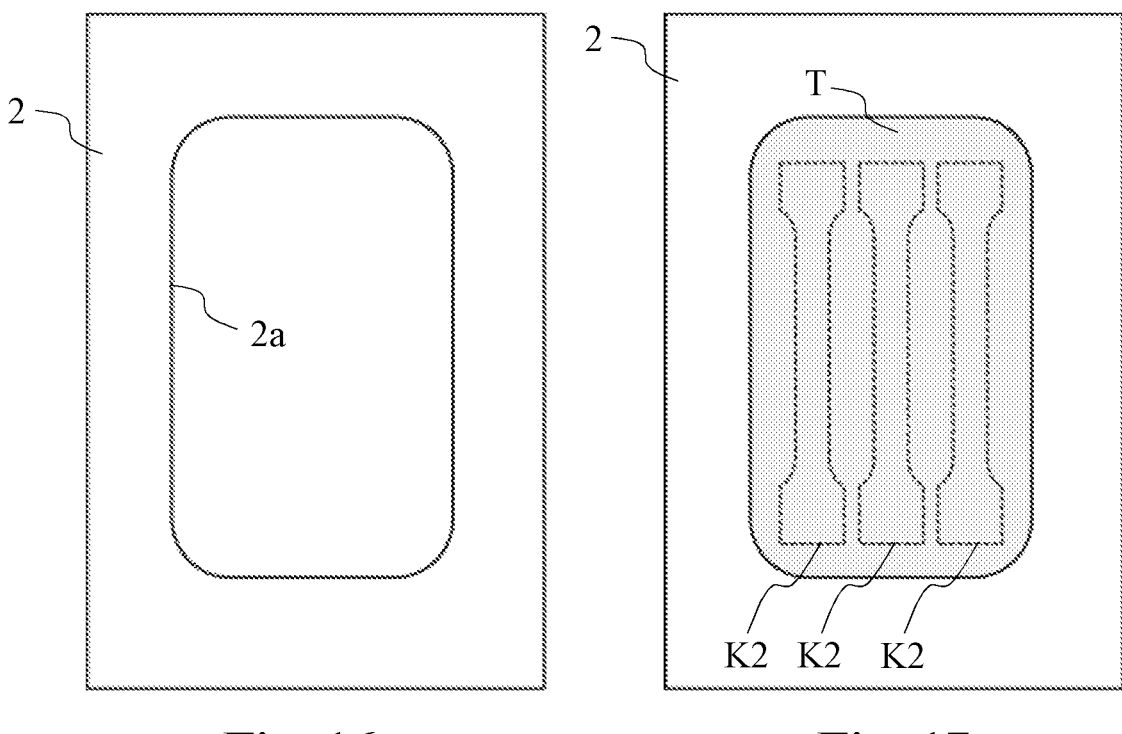
Fig. 16　　　Fig. 17
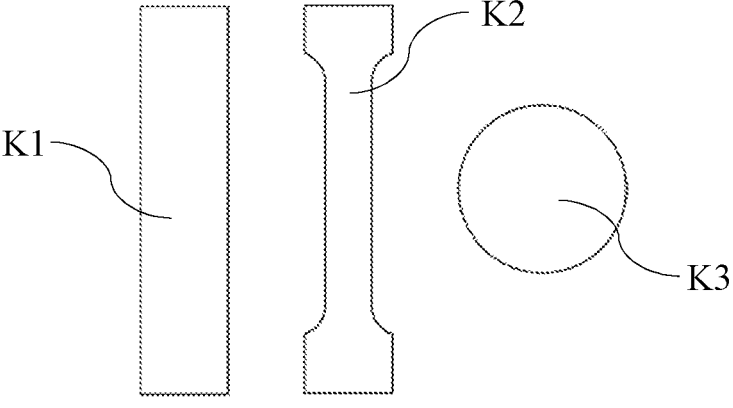
Fig. 18　　Fig. 19　　Fig. 20

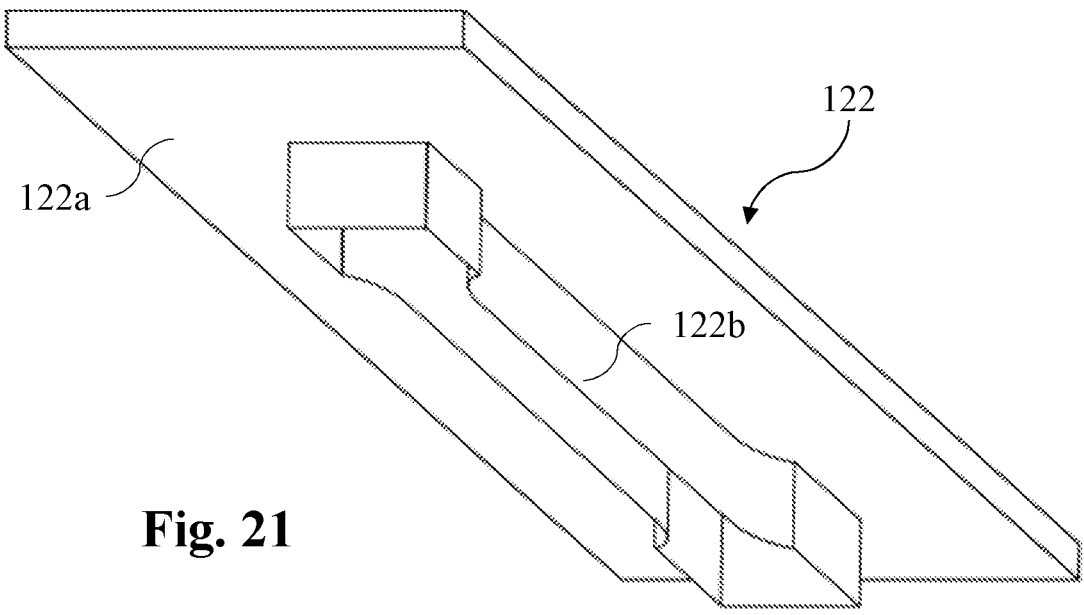
Fig. 21
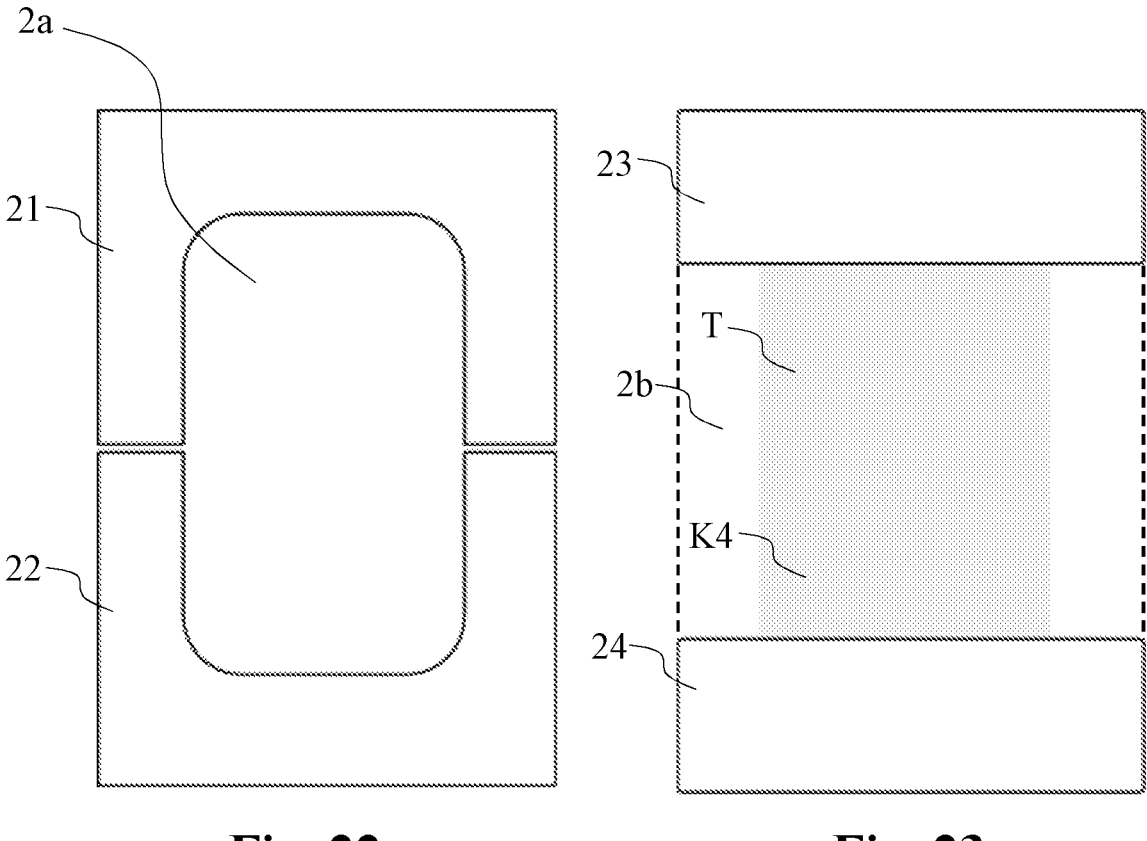
Fig. 22                 Fig. 23

METHOD AND DEVICE FOR PRODUCING A FILM-SHAPED TEST BODY

CROSS REFERENCE TO RELATED APPLICATIONS

This application is the United States national phase of International Patent Application No. PCT/CH2022/050016 filed Jul. 12, 2022, and claims priority to Switzerland Patent Application No. CH070074/2021 filed Jul. 16, 2021, the disclosures of which are hereby incorporated by reference in their entireties.

BACKGROUND OF THE INVENTION

Field of the Invention

The present invention relates to a method and a device for producing a film-shaped test body from a solidifiable test substance, especially a liquid test substance.

Description of Related Art

In research and development, but also in quality assurance as part of the production process, it is crucial that newly developed, newly formulated or newly created materials can be tested, analysed and compared with one another quickly and with little effort in order to identify the material variant(s) that have desired and targeted material properties or, in the case of materials in the production process, to ensure that they meet the physical requirements. The development and formulation of new materials or the production of known and established materials is nowadays becoming increasingly automated, because automated formulation and production methods offer considerable advantages over manual, non-automated methods. For example, automation makes it possible for new substances and materials to be investigated with a comparatively lower level of effort and resource requirements, because the batch quantities are usually smaller than in the case of traditional, manual laboratory methods. In addition, automated methods are also able to run autonomously round the clock, without requiring a human worker who performs the individual working steps, and the use of automated methods also makes it possible largely to exclude potential human operational errors during the production of the material.

In order to test the physical properties of a liquid material that hardens or dries after application (for example plastics, adhesive, paint, . . . ) there are also carried out inter alia tensile tests in which a test body consisting of the material to be tested is pulled (stretched) lengthwise until the test body breaks. The force required for a test body of defined dimensions (in respect of cross-sectional surface area) until it breaks as well as the measured ratio between the length of elongation and the amount of force applied enable conclusions to be drawn as to the tensile strength of the material.

For such testing methods it is customary that the still-liquid materials being tested are applied to a poorly adhesive surface, such as, for example, a test card and then, once the material has dried/hardened, carefully detached from that surface, cut or punched into a desired shape and then tested for tensile strength.

The application of the test substance to the carrier surface is effected, for example, by spraying on the liquid, by drawdown (blade application of the liquid by means of a doctor blade), by pouring the test substance directly onto the surface, or by other methods, such as brush application, stamping, spin-coating or vapour deposition.

After application, the test substance is dried or cured on the carrier surface and then removed from the carrier surface and given a form suitable for the testing (test body) (for example by cutting to a desired size and shape or by punching out a defined shape).

The test itself consists essentially of clamping the test body at two ends into a measuring device (tensile testing machine/universal testing machine) and then moving the two ends away from one another, the test body clamped between the two ends being subjected to a force and the test body being stretched. The force is applied until the test body breaks, and the forces acting for the corresponding elongation lengths are recorded and usually presented in the form of what is known as a stress/strain diagram. Such tensile testing machines correspond to the current standard, are known to the person skilled in the art and therefore need no further explanation.

While both the application of the test substance to a substrate (for example by spraying, drawdown, pouring into a mould, spin-coating, brush application, . . . ) and the final testing/measurement of the test body are technically readily achievable and capable of automation using devices customary in the industry today, the detachment of the film-like test body so produced from the carrier surface of the substrate is, however, difficult to automate, because the resulting film can very easily be damaged. Such a detachment operation is therefore usually performed manually, for example by lifting up a corner of the film with a finger or by tearing the substrate, and then carefully removing the film with the fingers.

For fully automated formulation/production, for example in the context of research & development or in quality control, it is necessary, however, also to be able to automate that manual step of detaching the finished film-like test body from its support.

SUMMARY OF THE INVENTION

The method according to the invention and the device according to the invention have the objective of rendering the entire operation of producing a film-shaped test body, that is to say including the delicate operation of detaching the film from the substrate to which it is adhering, capable of automation. The objective is thereby to make it possible to automate the production of a film-shaped test body right through to the subsequent measurement of the tensile strength or other physical and chemical properties.

In particular, the present invention has the objective of providing a method and a device for producing a film-shaped test body which enable the production of a film-shaped test body to be fully automated.

The problem underlying the invention is solved by the method according to the invention defined herein and by the device defined herein. Especially advantageous developments and configurations of the method according to the invention and the device according to the invention are subject matter of the respective dependent patent claims.

In the method according to the invention for producing a film-shaped test body from a solidifiable test substance a) the test substance is applied to a substrate, so that a substrate film is formed on the substrate;

b) a film-detachment tool is placed on the substrate film, the film-detachment tool leaving a sub-region of the substance film uncovered;

c) the substance film is solidified to form a test film which adheres to the film-detachment tool;

d) the film-detachment tool, together with the test film adhering thereto, is separated from the substrate; and e) the film-shaped test body is formed by or from the test film separated from the substrate.

By the use of the special film-detachment tool, the solidified test film can be very simply and easily loosened from the substrate, so that the detachment of the test film from the substrate can also be simply automated.

According to an advantageous configuration of the method, the film-detachment tool comprises an adhesive surface which faces towards the substance film, which adhesive surface exhibits greater adhesiveness towards the test film than does the substrate. Alternatively or in addition, an adhesion promoter is applied between the adhesive surface of the film-detachment tool and the substance film, so that the adhesiveness between film-detachment tool and test film is greater than between test film and substrate. This ensures that the test film remains reliably adhering to the film-detachment tool.

Advantageously, the test body is formed by cutting or punching the test film which is still adhering to the film-detachment tool. According to a further advantageous embodiment, the test film is separated from the film-detachment tool and the test body is formed by cutting or punching the test film which has been separated from the film-detachment tool. As a result, the test film can be simply processed further, for example cut or punched into the desired shape of the test body.

In another advantageous embodiment, the test film which has been separated from the substrate and is adhering to the film-detachment tool forms the film-shaped test body, the film-detachment tool preferably comprising two non-contiguous frame members. After being separated from the substrate, the test film remains connected to the two frame members adhering to it and, together therewith, can be introduced directly into a tensile testing device.

In an especially advantageous embodiment, parts of a measuring device for the test body are used as frame members for the film-detachment tool. As a result, the intermediate step of clamping the frame members into the measuring device is unnecessary.

Preferably, the test substance is a liquid that is solidifiable by drying, curing or freezing, for example glue or paint. The test substance can advantageously also be a suspension containing living cells, for example skin cells, which forms a cell layer on solidification. Furthermore, the test substance can also be a powder which becomes a continuous, preferably homogeneous solid as a result of a treatment step.

In respect of the device, the core of the invention lies in the following: the device for producing a film-shaped test body from a solidifiable test substance comprises a substrate on which a substance film can be formed from test substance applied to the substrate. The device further comprises a film-detachment tool having an adhesive surface with which the tool can be placed on the substance film formable on the substrate, the film-detachment tool being shaped so that it leaves a sub-region of the substance film uncovered.

The specially configured film-detachment tool enables the solidified test film to be very simply and easily loosened from the substrate, so that the detachment of the test film from the substrate can also be simply automated.

Advantageously, the adhesive surface of the film-detachment tool exhibits greater adhesiveness towards a test film that can be created by solidification of the substance film than does the substrate. This ensures that the test film can be reliably detached from the substrate.

In advantageous embodiments, the film-detachment tool is configured as a one-part or two-part frame having a window, which frame can be placed with its adhesive surface on the peripheral region of the substance film formable on the substrate so that the window leaves a central region of the substance film uncovered.

Advantageously, the film-detachment tool is formed by parts of a measuring device for the test body, preferably integrated directly into the measuring device. As a result, the automation of the testing operation is further simplified.

Preferably the device comprises a substrate storage unit for substrates, a film-detachment tool storage unit for film-detachment tools, a supply container for test substance and a computer-controlled manipulator which is configured to remove a substrate from the substrate storage unit and deposit it at a working area, to remove test substance from the supply container and apply it to the substrate ready-positioned at the working area, so that a substance film is formed on the substrate, to remove a film-detachment tool from the film-detachment tool storage unit and place it on the substance film formed on the substrate, and to separate the film-detachment tool, together with a test film adhering thereto, which test film has been formed by solidification of the substance film, from the substrate.

This device allows all steps of the method according to the invention to be performed fully automatically.

Advantageously, the device has an assembly storage unit for holding assemblies which each comprise a substrate, a substance film formed thereon and a film-detachment tool. In such an assembly storage unit, a multiplicity of assemblies simultaneously can be cured or dried and the corresponding substance films solidified to form test films.

Preferably, the manipulator of the device is configured to deposit an assembly consisting of substrate, substance film and film-detachment tool in the assembly storage unit and to remove an assembly consisting of substrate, solidified test film and film-detachment tool from the assembly storage unit.

In an advantageous embodiment, the device comprises a separating tool operable by the manipulator, preferably a punching tool, with which a test body of the desired shape can be cut out or punched out from the test film.

BRIEF DESCRIPTION OF THE DRAWINGS

The terms Fig., Figs., Figure, and Figures are used interchangeably in the specification to refer to the corresponding figures in the drawings.

The method according to the invention and the device according to the invention are described in greater detail below with reference to exemplary embodiments shown in the drawings, wherein:

FIG. 16 shows an exemplary embodiment of a film-detachment tool according to the invention;

FIG. 17 shows an exemplary embodiment of the device according to the invention for producing a film-shaped test body with test film and punching lines for three test bodies;

FIG. 18-20 show various test body shapes;

FIG. 21 shows an example of a separating tool in the form of a punching tool for punching out a test body;

FIG. 22-23 show two multi-part variants of a film-detachment tool which allow direct clamping into a measuring device or which are capable of direct integration into a testing device;

DESCRIPTION OF THE INVENTION

The following observations apply in respect of the description which follows: where, for the purpose of clarity of the drawings, reference signs are included in a Figure but are not mentioned in the directly associated part of the description, reference should be made to the explanation of those reference signs in the preceding or subsequent parts of the description. Conversely, to avoid overcomplication of the drawings, reference signs that are less relevant for immediate understanding are not included in all Figures. In that case, reference should be made to the other Figures.

In the context of the present invention, "substrate" is to be understood as being a usually, but not necessarily, flat, plate-like carrier which is able to receive a test substance in the form of a film.

"Test substance" is to be understood as being any substance, especially a liquid or paste-like or spreadable substance, which can be applied to the substrate so that a substance film is formed on the substrate, and which is chemically or physically solidifiable, for example by curing or also by simple drying. In principle, however, all substances are possible which are initially easily deformable but are at least to a certain extent solid in the final state. Such substances therefore also include, for example, certain powders which coalesce to form a solid layer in a processing step. In principle, however, the method is suitable for all substances which are initially present in liquid form but, after a working step or a waiting period, are in solid or at least solidified form, that is to say the method is also suitable, for example, for liquids which are frozen or form a gel after application to the test substrate. In addition, it is also possible to use, for example, cell suspensions, in which case in the curing phase the cells coalesce to form a thin cell layer which could be used, for example, for culturing and transplantation of skin tissue. Furthermore, the substance film can also be created by sublimation from a gaseous substance.

A "film-detachment tool" is to be understood as being a frame arrangement consisting of one or more parts and having an adhesive surface with which the tool can be placed on the substance film formable on the substrate, the tool being shaped so that it does not cover a sub-region, preferably a central or inner sub-region, of the substance film, that is to say it leaves that sub-region uncovered.

Figure 25:
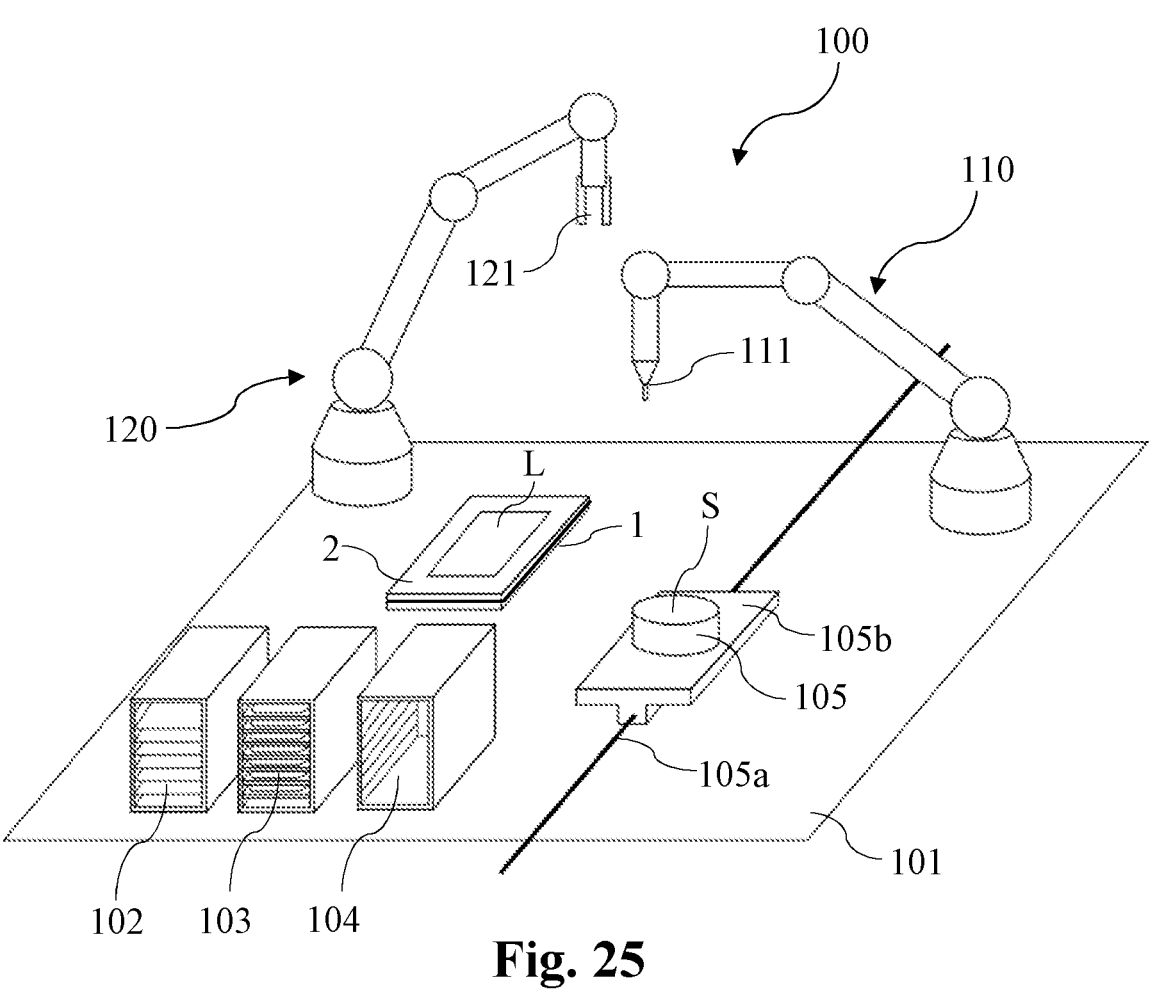
FIG. 25 shows, in greatly simplified form, the basic structure of a device according to the invention for producing a film-shaped test body, which device is suitable for performing the method according to the invention.

FIGS. 1 to 8 show, in greatly simplified form, the progression of the production of a film-shaped test body, but do not show the parts of an exemplary manipulator, shown in FIG. 25, that perform those steps.

Figures 1, 2, 3, 4, 5, 6, 7, 8:
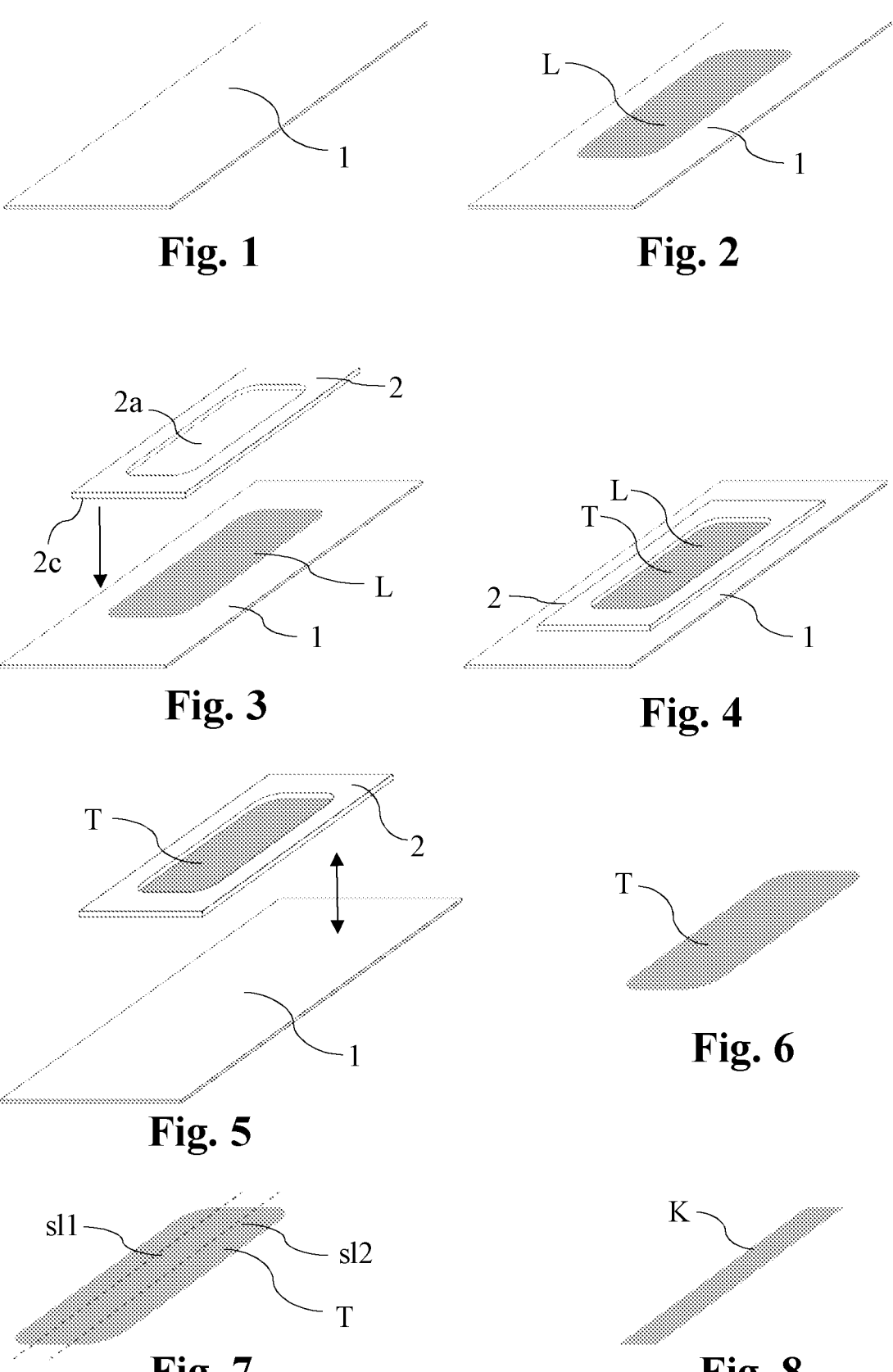
FIG. 1-8 show, in a simplified view, the progression of the method according to the invention from the empty substrate to the finished film-shaped test body.

FIG. 1 shows an empty plate-like substrate 1 which acts as carrier for the test substance later applied, for the substance film formed therefrom and finally for the solidified test film. The substrate 1 is configured so that it exhibits poor adhesion towards the test film. For that purpose, the substrate is formed, for example, from a poorly adhesive material or is provided with a poorly adhesive coating (for example made of PTFE). The adhesiveness of the substrate or its surface or of the coating is determined by interfacial energy forces. Structuring of the surface (surface roughness) likewise affects the adhesiveness. The surface of the substrate or its coating should therefore inter alia be as smooth as possible in order to minimise adhesiveness.

Advantageously, the substrate 1 consists, for example, of a flat flexible plate, for example made of paper, cardboard or plastics, which has a poorly adhesive surface in the above sense. Such a low level of adhesion can be achieved, for example, by a suitable non-stick coating or simply by manufacturing the corresponding parts from a poorly adhesive material. Just the simple application of a plastics coating to a paper or cardboard plate, depending upon the substance to be used, can already provide the desired effect of low adhesion of the test substance or the solidified test film to the substrate 1.

In a further advantageous configuration, the substrate 1 consists of a solid (relatively rigid) plate, for example made of cardboard, metal, plastics or glass, the surface of which is also configured so as to be poorly adhesive. Here, for example, plates made of PTFE or other plastics having low surface roughness and low adhesiveness are therefore especially advantageous.

In a first step of the method according to the invention, the test substance is applied to the substrate 1, for example by blade application, spraying, etc., so that a substance film L is formed on the substrate 1 (FIG. 2). The substrate 1 could also be designed with a (shallow) depression into which the test substance is applied. The application of the test substance can also be effected by sublimation from the gaseous phase.

Figures 9, 10, 11, 12, 13, 14, 15:
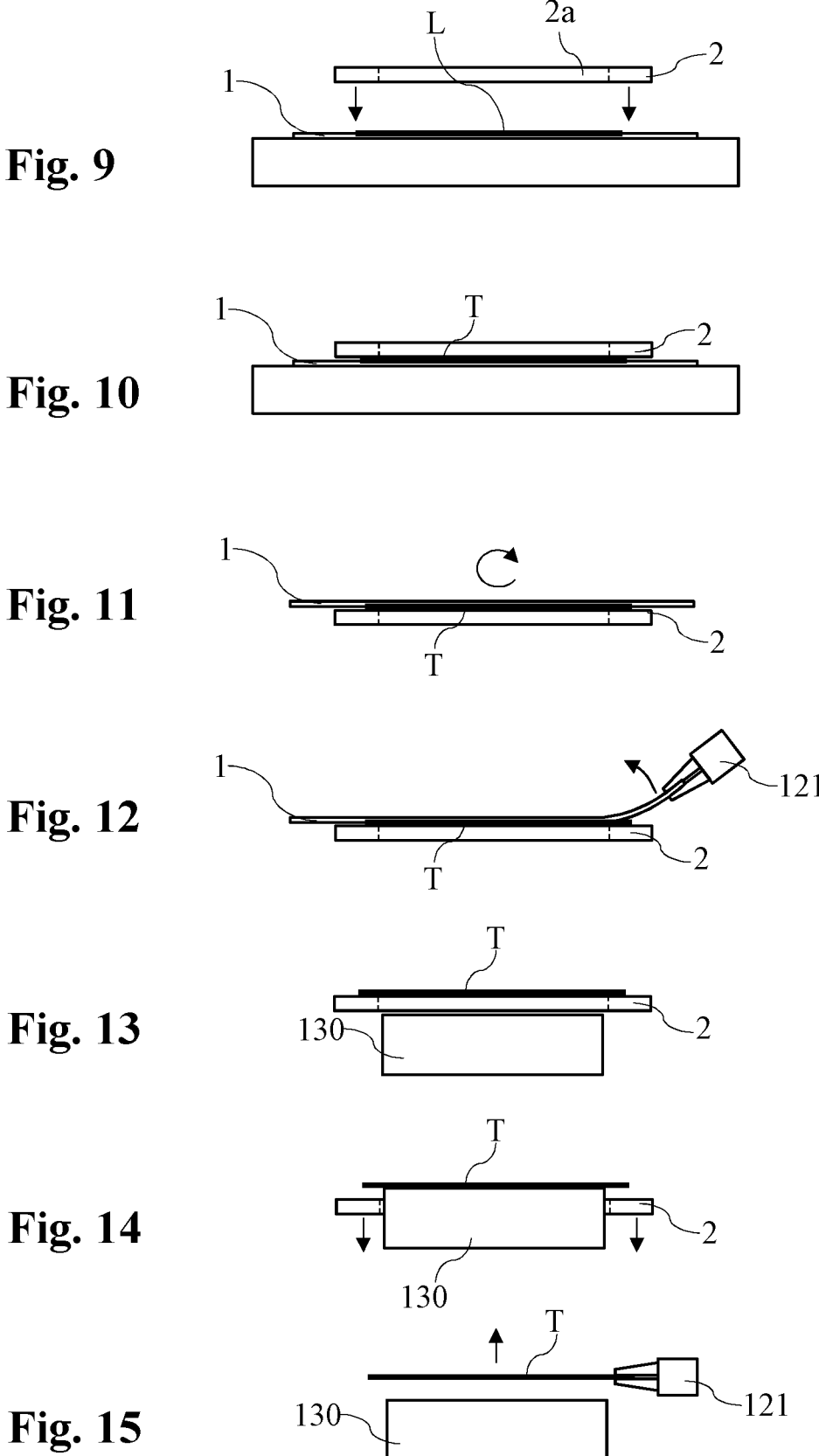
FIG. 9-15 show, in a simplified side view, the progression of the method according to the invention from the empty substrate to the test film removed from the film-detachment tool.

In a next step, a film-detachment tool is positioned over the substrate 1 (FIGS. 3 and 9) and placed or pressed onto the substrate 1 having the substance film L located thereon (FIGS. 4 and 10). The film-detachment tool is in this example configured as a one-part, closed flat frame 2 having a window 2a (see also FIG. 16). The film-detachment tool or frame 2 rests with its flat underside or adhesive surface 2c in direct contact with the outer region of the still moist, that is to say not yet solidified, substance film L. The surface quality of the adhesive surface 2c of the frame 2 facing towards the substance film L, that is to say the side of the frame with which the substance film L is in contact, is such that it exhibits relatively good adhesion towards the test substance, its adhesiveness being significantly greater than that of the substrate 1. This has the result that, after the solidification (drying/curing) of the substance film L, the test film T so formed has better adhesion to the frame 2 than to the substrate 1. The greater adhesiveness of the film-detachment tool or frame 2 in comparison with the substrate 1 can be achieved by a suitable choice of material and also by surface structuring (surface roughness) of the adhesive surface 2c. Alternatively or in addition, the greater adhesiveness can also be achieved by application of an adhesion promoter.

The film-detachment tool need not have the same external dimensions as the substrate. It is important only that it covers the substance film applied to the substrate and in so doing leaves a sub-region, preferably a central or inner sub-region, of the substance film uncovered.

The assembly formed by the substrate 1 which has been thus coated with the substance film L and provided with the film-detachment tool or frame 2 is stored for solidification (drying/curing) of the substance film L. This can be effected, for example, in an assembly storage unit 104 suitable for that purpose (FIG. 25), which is equipped with one storage position or with a multiplicity of storage positions for such assemblies. Depending upon the substance S used, here advantageous assembly storage units are those which have suitable devices for assisting solidification (drying/curing), for example by elevated temperature (heated cabinet) and/or improved air circulation in the case of water-based or solvent-based, air-drying substances, or UV radiation in the case of, for example, UV-hardening substances. If test substances which solidify relatively quickly by themselves are being processed, the assembly can be processed further directly, that is to say without intermediate storage.

As a result of the solidification (drying/curing), a test film T is produced from the substance film L. After solidification and, where applicable, intermediate storage in the assembly storage unit 104, the film-detachment tool or frame 2 is separated from the substrate 1, for example by lifting. Since the then solidified test film T adheres more strongly to the film-detachment tool or frame 2 than to the substrate 1, the test film T too is lifted together with the film-detachment tool or frame 2 and removed from the substrate 1 (FIGS. 5 and 12). Depending upon the embodiment, either the frame 2 with the test film T adhering thereto is lifted off the substrate 1, or conversely the frame 2 is first turned over (FIG. 11) and the substrate 1 is then removed from the frame 2 with the test film T adhering thereto, for example by being grasped and lifted by a gripping tool 121 (FIGS. 12 and 25). The film-detachment tool or frame 2 and the substrate 1 are easier to grasp than the test film T, so that the separation of the test film T from the substrate 1 is relatively simple to automate.

The separation of the test film T from the substrate 1 can also be effected by removing the substrate 1 by a chemical method, for example by etching. This, of course, requires the use of an appropriate substrate.

The film-detachment tool or frame 2 with the test film T adhering thereto can then either be stored for later use in an intermediate storage unit suitable for that purpose or used further directly.

For further use, the test film T in the exemplary embodiment shown is removed from the frame 2 (FIG. 6) and given the desired shape of the final film-shaped test body K (FIG. 8), for example by cutting along cutting lines s11 and s12 (FIG. 7), and the test body can then be used for measurement (not shown herein) of the tensile strength or some other physical or chemical testing method. For that purpose, in an advantageous configuration the test film T is additionally provided with a thin layer of powder, for example of talcum powder, which further protects the test film T and facilitates later handling. The removal of the test film T from the frame 2 can be effected, for example, simply by its being pushed out of the frame, as shown in FIGS. 13-15. For that purpose, the frame 2 with the test film T adhering thereto is, for example, placed on a punch 130 of the same shape as the window 2a (FIG. 13) and the frame 2 is moved further along the punch 130 (FIG. 14), during which the punch 130 holds the test film T on the support, and the test film T becomes detached from the frame 2. After raising the punch 130, the test film can be removed and used further (FIG. 15).

In an alternative advantageous embodiment, the test body K is not cut out from the test film T but punched into the desired shape of the test body by means of a suitable separating tool in the form of a punching tool (see FIG. 21). The shape of the test body K corresponds to the shapes customary for such applications and can vary as required. The test body can be, for example, rectangular (K1, FIG. 18), but may also have other shapes that are advantageous in the application, such as, for example, a rectangular bar with widened areas at both ends (K2, FIG. 19) which allow a good grip during the measuring operation. In principle, an extremely wide variety of shapes and sizes of test body is possible and appropriate, according to the field of application, for example also the shape of a circular disc (K3, FIG. 20).

It is also possible to cut out or punch out one or more either identical or differently shaped test bodies from a test film T, especially also without prior separation of the test film T from the film-detachment tool or frame 2. In the case of the embodiment shown in FIG. 17, the test film T is not first removed from the film-detachment tool or frame 2 for cutting-out/punching-out, but instead the test body is cut out/punched out directly from the region of the test film left uncovered by the frame 2 while the test film T is still being held by the film-detachment tool or frame 2. In particular, here three film-shaped test bodies K2 are punched out from the test film T still adhering to the frame 2.

Figure 24:
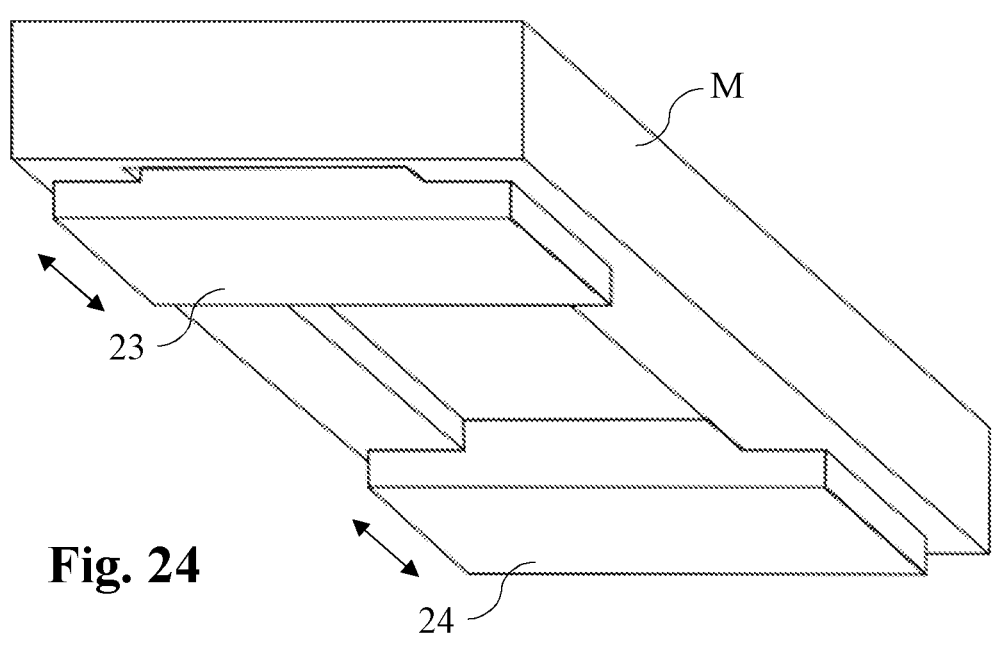
FIG. 24 is a diagrammatic sketch of a measuring device with an integrated film-detachment tool.

In addition, it is also possible to use the test film T directly as test body even without prior cutting/punching-out if the outline of the substance film originally formed is sufficient for the measurement and is suitable for the measuring operation (K4, FIGS. 23 and 24). This can also be appropriate, for example, for penetration tests.

In a further embodiment according to FIG. 22, the film-detachment tool is configured as a two-part frame, its two frame members 21 and 22 each holding a side of the test film and forming between them the window 2a that does not cover the substance film. In this embodiment, the two frame members 21 and 22 can be clamped directly into a tensile measuring device, once the test film T has been given the desired shape of the test body by cutting/punching and removal of the parts not required. In a simplified embodiment (FIG. 23), the film-detachment tool can also be formed just by two, for example rectangular, plates 23 and 24 which form between them a window 2b and are located over the two ends of the substance film or the test film T.

Advantageously, the two plates 23 and 24 are directly the parts of a (tensile) measuring device M shown diagrammatically in FIG. 24, which parts are movable relative to one another, so that the intermediate step of clamping the frame members 23 and 24 into the measuring device M is unnecessary. This has the advantage that it would thus be impossible to lose the test body during transport and clamping into the measuring device or to damage the highly sensitive and fragile test body during that operation. In this variant, the plates 23 and 24 forming the film detachment device (together with the measuring device) are pressed onto the test film located on the substrate. Here too, the substrate 1 is removed, for example by means of a gripping tool 121, once the test film T has solidified, the test film remaining adhering to the plates 23 and 24 of the measuring device M. A cutting-out step is accordingly unnecessary and the test body K corresponds to the entire test film T.

The film-shaped test bodies produced in accordance with the above explanation are then available for examination in known measuring/testing devices in accordance with physical and, optionally, also chemical testing methods.

FIG. 25 shows, in greatly simplified form, the basic structure of a device according to the invention for producing a film-shaped test body, which device is suitable for performing the method according to the invention.

The device indicated as a whole by 100 advantageously but not necessarily comprises-arranged on a base plate 101 or a stand—a substrate storage unit 102, a film-detachment tool or frame storage unit 103, an assembly storage unit 104, a supply container 105 for test substance S, and a computer-controlled manipulator in the form of in this case, for example, two robotic arrangements 110 and 120.

The substrate storage unit 102 comprises a plurality of storage positions in which a supply of substrates 1 is kept. Analogously, the film-detachment tool or frame storage unit 103 comprises a plurality of storage positions holding a supply of film-detachment tools or frames 2. The assembly storage unit 104 comprises a plurality of storage positions which are configured to hold substrates 1 having substance films L formed thereon and film-detachment tools or frames 2 located thereon. The assembly storage unit 104 is advantageously equipped with devices for assisting the solidification (drying/curing) of the substance films L. For that purpose, the assembly storage unit can be, for example, in the form of a heated cabinet and contain air-circulation means and/or radiation sources, especially UV sources. If test substances which solidify relatively quickly by themselves are being processed, the assembly storage unit 104 can be omitted.

The robotic arrangement 120 comprises a gripping tool 121 and is configured to remove a substrate 1 from the substrate storage unit 102 and deposit it at a working area on the base plate 101. The substrate 1 can there be fixed in place on the base plate 101, for example by means of a suction device (not shown).

The robotic arrangement 110 comprises an application tool 111 and is configured to remove test substance S from the supply container 105 and apply it to the substrate 1 ready-positioned at the working area, so that a substance film L is formed on the substrate 1. The supply container 105 can be arranged, for example, on a carriage 105b which is movable along a rail 105a. The application tool 111, which is only symbolically represented, can comprise, for example, a doctor blade device, spraying device, vapour-deposition device, stamping device, brushing device or some other application devices customary in the industry for liquids or paste-like or spreadable substances. Such suitable devices are known to the person skilled in the art and are therefore not explained in detail herein.

The robotic arrangement 120 is further configured to remove a film-detachment tool or frame 2 from the film-detachment tool or frame storage unit 103 and place it and possibly press it onto the substance film L formed on the substrate 1.

Furthermore, the robotic arrangement 120 is configured to deposit an assembly consisting of substrate 1, substance film L and film-detachment tool or frame 2 in a storage position in the assembly storage unit 104.

The robotic arrangement 120 is further configured to remove an assembly consisting of substrate 1, solidified test film T and film-detachment tool or frame 2 from the assembly storage unit 104 and to separate the substrate 1 from the film-detachment tool or frame 2 with the test film T adhering thereto, by grasping the substrate 1 with the gripping tool 121 and removing it from the frame 2 (see also FIG. 12).

Furthermore, the robotic arrangement 120 can be configured to cut out or punch out a test body K of the desired shape from the test film T. For that purpose the robotic arrangement 120 can be equipped with a suitable cutting or punching tool as separating tool. An example of a punching tool is shown in FIG. 21. The punching tool 122 comprises a base 122a and, located thereon, a punching frame 122b the outline of which corresponds to the desired shape of the test body to be produced.

The above-described functions of the robotic arrangements 110 and 120 can also be realised, for example, by a computer-controlled manipulator in the form of a multi-axis robot having a multi-purpose working head or exchangeable tools.

The invention claimed is:

1. A method for producing a film-shaped test body from a solidifiable test substance, wherein
 a) the solidifiable test substance is applied to a substrate, so that a substance film is formed on the substrate;
 b) a film-detachment tool is placed on the substance film, the film-detachment tool leaving a sub-region of the substance film uncovered;
 c) the substance film is solidified to form a test film which adheres to the film-detachment tool;
 d) the film-detachment tool, together with the test film adhering thereto, is separated from the substrate; and
 e) the film-shaped test body is formed by or from the test film separated from the substrate.

2. The method according to claim 1, wherein the film-detachment tool comprises an adhesive surface which faces towards the substance film, which adhesive surface exhibits greater adhesiveness towards the test film than does the substrate.

3. The method according to claim 1, wherein the film-detachment tool comprises an adhesive surface which faces towards the substance film, between which adhesive surface and the substance film there is applied an adhesion promoter, so that the adhesiveness between the film-detachment tool and the test film is greater than that between test film and the substrate.

4. The method according to claim 1 wherein the test body is formed by cutting or punching the test film adhering to the film-detachment tool.

5. The method according to claim 1, wherein the test film is separated from the film-detachment tool; and the test body is formed by cutting or punching the test film which has been separated from the film-detachment tool.

6. The method according to claim 1, wherein the test film which has been separated from the substrate and is adhering to the film-detachment tool forms the film-shaped test body.

7. The method according to claim 6, wherein parts of a measuring device for the test body are used as frame members for the film-detachment tool.

8. The method according to claim 1, wherein the test substance is a liquid that is solidifiable by drying, curing or freezing, a suspension containing living cells which forms a cell layer on solidification, or a powder which becomes a continuous solid as a result of a treatment step.

9. The method according to claim 6, wherein the film-detachment tool comprises two non-contiguous frame members.

\* \* \* \* \*